United States Patent
Hsu et al.

(10) Patent No.: US 10,003,488 B2
(45) Date of Patent: Jun. 19, 2018

(54) METHOD AND ELECTRONIC APPARATUS FOR AUTOMATICALLY DETECTING BANDWIDTH AND PACKET TYPE OF PACKET

(71) Applicant: MEDIATEK INC., Hsin-Chu (TW)

(72) Inventors: Chien-Fang Hsu, Taoyuan (TW); Jianhan Liu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 133 days.

(21) Appl. No.: 15/060,624

(22) Filed: Mar. 4, 2016

(65) Prior Publication Data

US 2016/0261434 A1    Sep. 8, 2016

Related U.S. Application Data

(60) Provisional application No. 62/129,118, filed on Mar. 6, 2015.

(51) Int. Cl.
*H04L 27/26* (2006.01)
*H04L 27/00* (2006.01)

(52) U.S. Cl.
CPC ...... *H04L 27/2666* (2013.01); *H04L 27/0012* (2013.01); *H04L 27/2613* (2013.01)

(58) Field of Classification Search
CPC ............. H04L 27/0012; H04L 27/2613; H04L 27/266
See application file for complete search history.

(56) References Cited

U.S. PATENT DOCUMENTS

| | | | | |
|---|---|---|---|---|
| 6,301,296 B1 * | 10/2001 | Krishnan | ............ | H04L 5/1453 375/222 |
| 2005/0190728 A1 * | 9/2005 | Han | ............ | H04B 7/2637 370/335 |
| 2006/0109780 A1 * | 5/2006 | Fechtel | ............ | H04L 5/06 370/203 |
| 2007/0060162 A1 * | 3/2007 | Xhafa | ............ | H04W 28/20 455/450 |
| 2008/0095277 A1 * | 4/2008 | Cheng | ............ | H04L 1/0091 375/340 |
| 2014/0003557 A1 * | 1/2014 | Wu | ............ | H04L 25/0226 375/343 |
| 2014/0072016 A1 * | 3/2014 | Lee | ............ | H04B 1/71635 375/146 |

(Continued)

*Primary Examiner* — Dung B Huynh
(74) *Attorney, Agent, or Firm* — Winston Hsu

(57) ABSTRACT

The present invention provides a method and an electronic apparatus for automatically detecting bandwidth and the packet type of a packet, so as to solve the problem mentioned above. The method comprises: detecting a plurality of symbols in the preamble of the packet; generating a sign pattern according to the symbols; and determining the bandwidth and the packet type of the packet according to the detected sign pattern. The electronic apparatus comprises: a symbol detecting circuit, a sign pattern generating circuit, and a determining circuit. The symbol detecting circuit is utilized for detecting a plurality of symbols in the preamble of the packet. The sign pattern generating circuit is utilized for generating a sign pattern according to the symbols. The determining circuit is utilized for determining the bandwidth and the packet type of the packet according to the detected sign pattern.

17 Claims, 5 Drawing Sheets

| Pattern | Channel BW | Packet Type |
|---|---|---|
| - - + | 540 MHz | Control PHY |
| - + - | 540 MHz | SC PHY |
| - + + | 540 MHz | OFDM PHY |
| + - + | 1080 MHz | SC PHY |
| + + - | 1080 MHz | OFDM PHY |

(56) References Cited

U.S. PATENT DOCUMENTS

2014/0169488 A1* 6/2014 Varanese ............. H04L 27/2613
　　　　　　　　　　　　　　　　　　　　375/260
2016/0044711 A1* 2/2016 Lou ................... H04W 74/0816
　　　　　　　　　　　　　　　　　　　　370/338

\* cited by examiner

| Pattern | Channel BW | Packet Type |
|---------|------------|-------------|
| - - +   | 540 MHz    | Control PHY |
| - + -   | 540 MHz    | SC PHY      |
| - + +   | 540 MHz    | OFDM PHY    |
| + - +   | 1080 MHz   | SC PHY      |
| + + -   | 1080 MHz   | OFDM PHY    |

FIG. 3

METHOD AND ELECTRONIC APPARATUS FOR AUTOMATICALLY DETECTING BANDWIDTH AND PACKET TYPE OF PACKET

CROSS REFERENCE TO RELATED APPLICATIONS

This application claims the benefit of U.S. Provisional Application No. 62/129,118, filed on Mar. 6, 2015 and included herein by reference.

BACKGROUND

In IEEE 802.11aj specifications, the transmission can be in 540 MHz channel or in 1080 MHz channel, and there are three PHY types including control (CTRL) PHY, single carrier (SC) PHY, and orthogonal frequency-division multiplexing (OFDM) PHY. It is desirable to detect the bandwidth before the channel estimation, especially for single carrier packets since there is no other training field that allows updating channel estimation for different bandwidth, and the receiver (RX) can perform channel estimation on only the occupied bandwidth other than the maximum transmission bandwidth. Packet type should be also detected before the channel estimation and PHY header decoding, and in this way the RX will not have to perform the parallel decoding for multiple possible packet formats. In addition, the bandwidth detection should be detected first since the channel estimation relies on the bandwidth information. However, the conventional method is not capable of detecting bandwidth and the packet type of a packet before the channel estimation.

SUMMARY

It is therefore one of the objectives of the disclosure to provide a method and an electronic apparatus for automatically detecting bandwidth and the packet type of a packet, so as to solve the problem mentioned above.

In accordance with an embodiment of the present invention, a method for automatically detecting bandwidth and the packet type of a packet is disclosed. The method comprises: detecting a plurality of symbols in a preamble of the packet; generating a sign pattern according to the symbols; and determining the bandwidth and the packet type of the packet according to the detected sign pattern.

In accordance with an embodiment of the present invention, an electronic apparatus for automatically detecting bandwidth and the packet type of a packet is disclosed. The electronic apparatus comprises: a symbol detecting circuit, a sign pattern generating circuit, and a determining circuit. The symbol detecting circuit is utilized for detecting a plurality of symbols in the preamble of the packet. The sign pattern generating circuit is utilized for generating a sign pattern according to the symbols. The determining circuit is utilized for determining the bandwidth and the packet type of the packet according to the detected sign pattern.

In accordance with an embodiment of the present invention, a transmission method is disclosed. The transmission method comprises: determining a bandwidth and a packet type; generating a sign pattern of a plurality of symbols in a preamble of a packet according to the bandwidth and the packet type; and transmitting the preamble of the packet.

Briefly summarized, the method and the electronic apparatus disclosed by the embodiments can automatically detect bandwidth and the packet type of a packet, and the method and the electronic apparatus do not have to perform the parallel decoding for multiple possible packet formats.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates the sign pattern table in accordance with an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
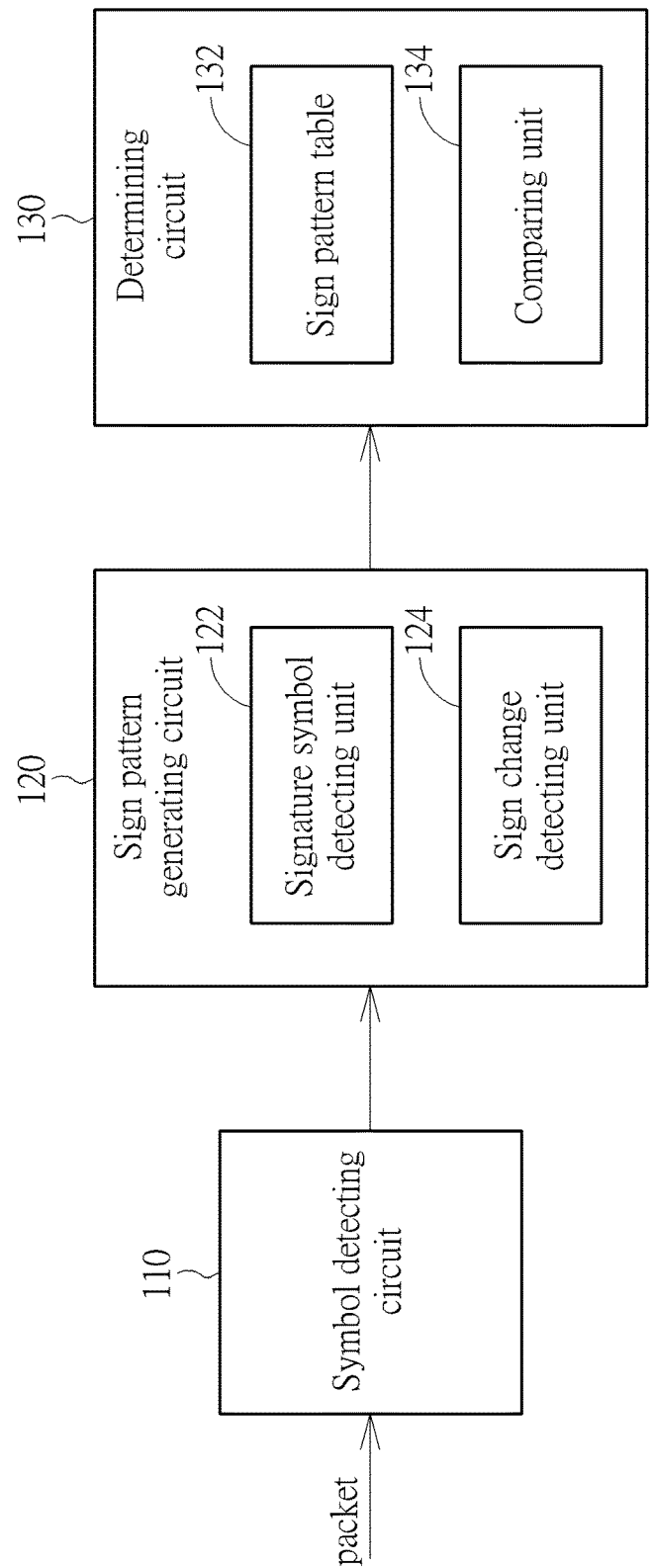
FIG. 1 is a simplified diagram of an electronic apparatus 100 for automatically detecting bandwidth and the packet type of a packet when receiving the packet in accordance with an embodiment of the present invention.

Please refer to FIG. 1. FIG. 1 is a simplified diagram of an electronic apparatus 100 for automatically detecting bandwidth and the packet type of a packet when receiving the packet in accordance with an embodiment of the present invention, wherein the electronic apparatus 100 can be receiver (RX) of a smartphone or a tablet, and is applied to 40-50 GHz millimeter wave communication systems. The electronic apparatus 100 comprises: a symbol detecting circuit 110, a sign pattern generating circuit 120, and a determining circuit 130. The symbol detecting circuit 110 is utilized for detecting a plurality of symbols in the preamble of the packet. The sign pattern generating circuit 120 is utilized for generating a sign pattern according to the symbols. The determining circuit 130 is utilized for determining the bandwidth and the packet type of the packet according to the detected sign pattern.

The sign pattern generating circuit 120 comprises a signature symbol detecting unit 122 and a sign change detecting unit 124. The signature symbol detecting unit 122 is utilized for detecting a signature symbol to set a boundary for a plurality of channel estimation symbols. The function of detecting the signature symbol of the signature symbol detecting unit further comprises: detecting a first sign change of the symbols to detect the signature symbol. The sign change detecting unit 124 is utilized for detecting a plurality of sign changes of the channel estimation symbols to generate the sign pattern, wherein the sign pattern comprises a first sign, a second sign, and a third sign, and the first sign indicates the bandwidth of the packet, and the second sign and the third sign indicate the packet type of the packet, and the packet type of the packet is control PHY, single carrier PHY, or OFDM PHY in IEEE 802.11aj specification. The determining circuit 130 comprises: a sign pattern table 132 of bandwidth and the packet types and a comparing unit 134. The comparing unit 134 is utilized for comparing the detected sign pattern with the sign pattern table 132 to determine the bandwidth and the packet type of the packet.

Figure 2:
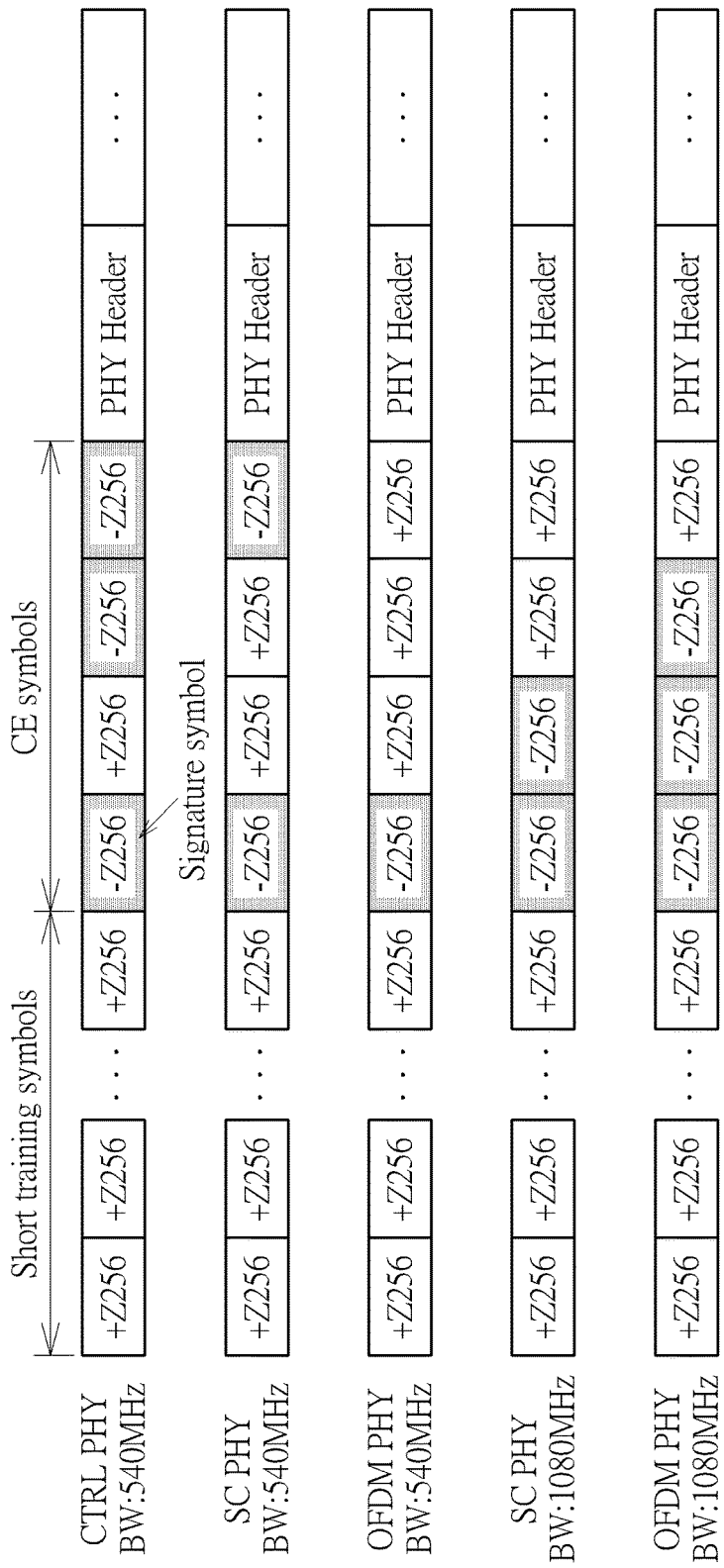
FIG. 2 is a diagram illustrating preambles of the packets in accordance with an embodiment of the present invention.

For example, in 45 GHz millimeter wave communication systems, there are five possible transmission schemes including three different packet formats (i.e. control (CTRL) PHY, single carrier (SC) PHY, and orthogonal frequency-division multiplexing (OFDM) PHY) and two kinds of bandwidth (BW) (i.e. 540 MHz and 1080 MHz). Please refer to FIG. 2. FIG. 2 is a diagram illustrating preambles of the packets in accordance with an embodiment of the present invention. As shown in FIG. 2, the preambles of the packets in the present invention can be designed by utilizing different polarizations of ZCZ 256 (Z256) sequences. For the preamble of the packet of Control PHY transmission using the 540 MHz channel, there are a plurality of symbols of +Z256 in the short training field and channel estimation (CE) symbols of −Z256, +Z256, −Z256, −Z256 in the channel estimation field. For the preamble of the packet of SC PHY transmission using the 540 MHz channel, there are a plurality of symbols of +Z256 in the short training field and CE symbols of −Z256, +Z256, +Z256, −Z256 in the channel estimation field. For the preamble of the packet of OFDM PHY transmission using the 540 MHz channel, there are a plurality of symbols of +Z256 in the short training field and CE symbols of −Z256, +Z256, +Z256, +Z256 in the channel estimation field. For the preamble of the packet of SC PHY transmission using the 1080 MHz channel, there are a plurality of symbols of +Z256 in the short training field and CE symbols of −Z256, −Z256, +Z256, +Z256 in the channel estimation field. For the preamble of the packet of OFDM PHY transmission using the 1080 MHz channel, there are a plurality of symbols of +Z256 in the short training field and CE symbols of −Z256, −Z256, −Z256, +Z256 in the channel estimation field.

In this embodiment, when the electronic apparatus 100 receives a packet, the symbol detecting circuit 110 can detect a plurality of symbols in the preamble of the packet, and the sign pattern generating circuit 120 can generate a sign pattern according to the symbols, wherein the signature symbol detecting unit 122 can detect a signature symbol (i.e. −Z256) to set a boundary for a plurality of channel estimation symbols, and the signature symbol is detected by detecting a first sign change of the symbols. The sign change detecting unit 124 can detect a plurality of sign changes of the CE symbols to generate the sign pattern. For example, if the CE symbols are −Z256, +Z256, −Z256, −Z256, then the sign pattern will be − − +. If the CE symbols are −Z256, +Z256, +Z256, −Z256, then the sign pattern will be − + −. If the CE symbols are −Z256, +Z256, +Z256, +Z256, then the sign pattern will be − + +. If the CE symbols are −Z256, −Z256, +Z256, +Z256, then the sign pattern will be + − +. If the CE symbols are −Z256, −Z256, −Z256, +Z256, then the sign pattern will be + + −.

Next, the determining circuit 130 can determine the bandwidth and the packet type of the packet according to the detected sign pattern, wherein the determining circuit 130 comprises a sign pattern table 132 of bandwidth and the packet types and a comparing unit 134, and the comparing unit 134 can compare the detected sign pattern with the sign pattern table 132 to determine the bandwidth and the packet type of the packet. For example, please refer to FIG. 3. FIG. 3 illustrates the sign pattern table 132 in accordance with an embodiment of the present invention. As shown in FIG. 3, if the detected sign pattern is − − +, then the determining circuit 130 can determine the bandwidth of the packet is 540 MHz and the packet type of the packet is control PHY. If the detected sign pattern is − + −, then the determining circuit 130 can determine the bandwidth of the packet is 540 MHz and the packet type of the packet is SC PHY. If the detected sign pattern is − + +, then the determining circuit 130 can determine the bandwidth of the packet is 540 MHz and the packet type of the packet is OFDM PHY. If the detected sign pattern is + − +, then the determining circuit 130 can determine the bandwidth of the packet is 1080 MHz and the packet type of the packet is SC PHY. If the detected sign pattern is + + −, then the determining circuit 130 can determine the bandwidth of the packet is 1080 MHz and the packet type of the packet is OFDM PHY. Please note that the above embodiment is only for an illustrative purpose and is not meant to be a limitation of the present invention. For example, the preamble design and the sign pattern table can be changed according to different design requirements.

In this way, the present invention can automatically detect bandwidth and the packet type of a receiving packet with the proper preamble design.

Figure 4:
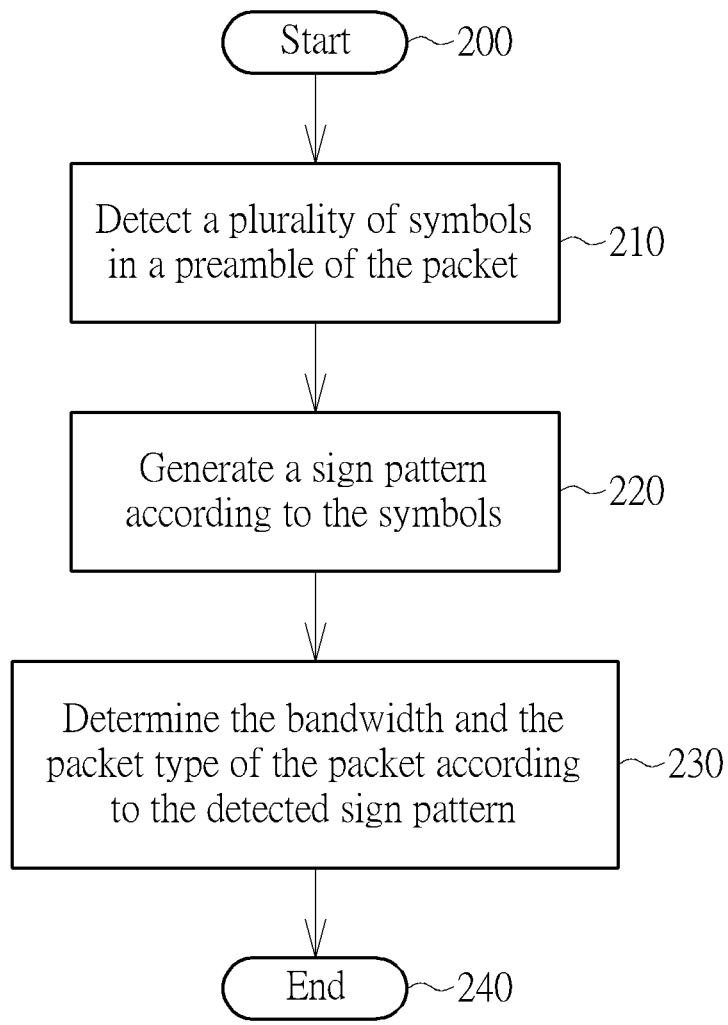
FIG. 4 is an exemplary flowchart showing a method in accordance with operation schemes of electronic apparatus in FIG. 1.

Please refer to FIG. 4. FIG. 4 is an exemplary flowchart showing a method in accordance with operation schemes of electronic apparatus 100 in the above embodiment. Provided that the result is substantially the same, the steps in FIG. 4 are not required to be executed in the exact order shown in FIG. 4. The method in accordance with the above embodiment of the electronic apparatus 100 in the present invention comprises the following steps:

Step 200: Start.
Step 210: Detect a plurality of symbols in the preamble of the packet.
Step 220: Generate a sign pattern according to the symbols.
Step 230: Determine the bandwidth and the packet type of the packet according to the detected sign pattern.
Step 240: End In addition, the step 220 can comprise: detecting a signature symbol to set a boundary for a plurality of channel estimation symbols; and detecting a plurality of sign changes of the channel estimation symbols to generate the sign pattern, wherein the step of detecting the signature symbol can further comprise: detecting a first sign change of the symbols to detect the signature symbol. The step 230 can comprise: comparing the detected sign pattern with a sign pattern table of bandwidth and the packet types to determine the bandwidth and the packet type of the packet. Please note that the above embodiment is only for an illustrative purpose and is not meant to be a limitation of the present invention.

Figure 5:
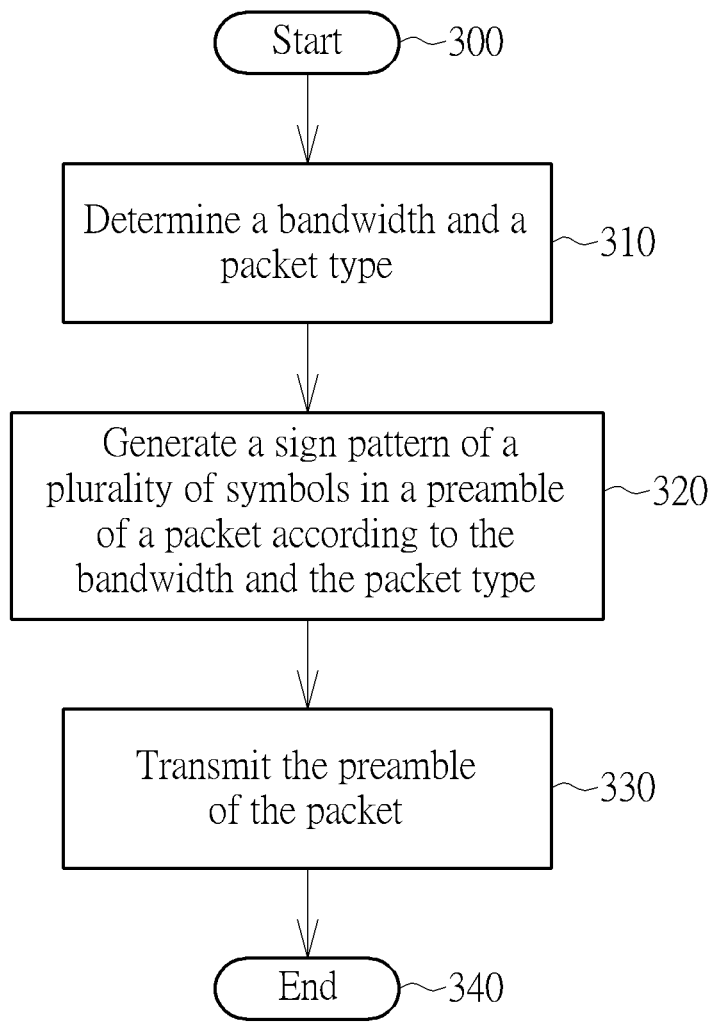
FIG. 5 is an exemplary flowchart showing a method in accordance with an operation scheme.

Please refer to FIG. 5. FIG. 5 is an exemplary flowchart showing a method in accordance with an operation scheme of a transmitter according to another embodiment. Provided that the result is substantially the same, the steps in FIG. 5 are not required to be executed in the exact order shown in FIG. 5. The method in accordance with the embodiment in the present invention comprises the following steps:

Step 300: Start.
Step 310: Determine a bandwidth and a packet type.
Step 320: Generate a sign pattern of a plurality of symbols in a preamble of a packet according to the bandwidth and the packet type.
Step 330: Transmit the preamble of the packet.
Step 340: End In addition, the step 320 can comprise: generating a signature symbol to set a boundary for a plurality of channel estimation symbols; and generating a plurality of sign changes of the channel estimation symbols to generate the sign pattern. The bandwidth of the packet can be any suitable bandwidth, such as but not limited to 540 MHz or 1080 MHz. The packet type of the packet can be any applicable format, such as but not limited to control PHY, single carrier PHY, or OFDM PHY in IEEE 802.11aj specification. Please note that the above embodiment is only for an illustrative purpose and is not meant to be a limitation of the present invention.

Briefly summarized, the method and the electronic apparatus disclosed by the embodiments can automatically detect bandwidth and the packet type of a packet, and the method and the electronic apparatus do not have to perform the parallel decoding for multiple possible packet formats.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for automatically detecting a bandwidth and a packet type of a received packet by an electronic apparatus, comprising:
   detecting a plurality of symbols in a preamble of the received packet in a receiver of the electronic apparatus;
   generating a sign pattern according to the symbols in the receiver; and
   determining the bandwidth and the packet type of the packet according to the detected sign pattern;
   wherein the sign pattern comprises a first sign, a second sign, and a third sign, and the first sign indicates the bandwidth of the packet, and the second sign and the third sign indicate the packet type of the packet.

2. The method of claim 1, wherein the step of generating the sign pattern according to the symbols comprises:
   detecting a signature symbol to set a boundary for a plurality of channel estimation symbols; and
   detecting a plurality of sign changes of the channel estimation symbols to generate the sign pattern.

3. The method of claim 2, wherein the step of detecting the signature symbol further comprises:
   detecting a first sign change of the symbols to detect the signature symbol.

4. The method of claim 1, wherein the step of determining the bandwidth and the packet type of the packet according to the detected sign pattern comprises:
   comparing the detected sign pattern with a sign pattern table of bandwidth and the packet type to determine the bandwidth and the packet type of the packet.

5. The method of claim 1, wherein the bandwidth of the packet is 540 MHz or 1080 MHz.

6. The method of claim 1, wherein the packet type of the packet is control PHY, single carrier PHY, or OFDM PHY in IEEE 802.11aj specification.

7. An electronic apparatus for automatically detecting a bandwidth and a packet type of a received packet, comprising:
   a symbol detecting circuit, for detecting a plurality of symbols in a preamble of the received packet by a receiver in the electronic apparatus;
   a sign pattern generating circuit, for generating a sign pattern according to the symbols; and
   a determining circuit, for determining the bandwidth and the packet type of the packet according to the detected sign pattern;
   wherein the sign pattern comprises a first sign, a second sign, and a third sign, and the first sign indicates the bandwidth of the packet, and the second sign and the third sign indicate the packet type of the packet.

8. The electronic apparatus of claim 7, wherein the sign pattern generating circuit comprises:
   a signature symbol detecting unit, for detecting a signature symbol to set a boundary for a plurality of channel estimation symbols; and
   a sign change detecting unit, for detecting a plurality of sign changes of the channel estimation symbols to generate the sign pattern.

9. The electronic apparatus of claim 8, wherein the function of detecting the signature symbol of the signature symbol detecting unit further comprises:
   detecting a first sign change of the symbols to detect the signature symbol.

10. The electronic apparatus of claim 7, wherein the determining circuit comprises:
    a sign pattern table of bandwidths and the packet types; and
    a comparing unit, for comparing the detected sign pattern with the sign pattern table of bandwidth and the packet type to determine the bandwidth and the packet type of the packet.

11. The electronic apparatus of claim 7, wherein the bandwidth of the packet is 540 MHz or 1080 MHz.

12. The electronic apparatus of claim 7, wherein the packet type of the packet is control PHY, single carrier PHY, or OFDM PHY in IEEE 802.11aj specification.

13. The electronic apparatus of claim 7, applied to 40-50 GHz millimeter wave communication systems.

14. A transmitting method of an electronic apparatus, comprising:
    determining a bandwidth and a packet type by a transmitter in the electronic apparatus;
    generating a sign pattern of a plurality of symbols in a preamble of a packet according to the bandwidth and the packet type by the transmitter; and
    transmitting the preamble of the packet by the transmitter;
    wherein the sign pattern comprises a first sign, a second sign, and a third sign, and the first sign indicates the bandwidth of the packet, and the second sign and the third sign indicate the packet type of the packet.

15. The method of claim 14, wherein the step of generating the sign pattern of the plurality of symbols in the preamble of the packet according to the bandwidth and the packet type comprises:
    generating a signature symbol to set a boundary for a plurality of channel estimation symbols; and
    generating a plurality of sign changes of the channel estimation symbols to generate the sign pattern.

16. The method of claim 14, wherein the bandwidth of the packet is 540 MHz or 1080 MHz.

17. The method of claim 14, wherein the packet type of the packet is control PHY, single carrier PHY, or OFDM PHY in IEEE 802.11aj specification.

* * * * *